United States Patent
Gupta et al.

(10) Patent No.: US 11,507,547 B2
(45) Date of Patent: Nov. 22, 2022

(54) MANAGEMENT OF INSTRUMENTATION DATA USING A RESOURCE DATABASE

(71) Applicant: Dell Products L.P., Round Rock, TX (US)

(72) Inventors: Chitrak Gupta, Bangalore (IN); Hari Venkatachalam, Bangalore (IN); Abhirup Seal, Kolkata (IN); Chandrasekhar Puthillathe, Bangalore (IN); Ranjan Kumar, Bangalore (IN); Sriparna Som, Bangalore (IN); Chinmay Hegde, Uttara Kannada (IN)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 16/446,224

(22) Filed: Jun. 19, 2019

(65) Prior Publication Data

US 2020/0401564 A1 Dec. 24, 2020

(51) Int. Cl.
| | | |
|---|---|---|
| *G06F 16/00* | (2019.01) | |
| *G06F 16/21* | (2019.01) | |
| *G06F 16/25* | (2019.01) | |
| *G06F 16/22* | (2019.01) | |
| *G06F 16/23* | (2019.01) | |

(52) U.S. Cl.
CPC ............ *G06F 16/212* (2019.01); *G06F 16/22* (2019.01); *G06F 16/2358* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 8,631,064 B2* | 1/2014 | Mukhopadhyay | .... | H04L 41/022 709/202 |
| 9,075,536 B1* | 7/2015 | Nielsen | ...................... | G06F 9/54 |
| 9,389,791 B2* | 7/2016 | Nielsen | ................ | G06F 9/5077 |
| 9,613,190 B2* | 4/2017 | Ford | ...................... | G06F 21/602 |
| 10,715,630 B2* | 7/2020 | Gupta | ...................... | G06F 9/547 |
| 2008/0162683 A1* | 7/2008 | Mukhopadhyay | .... | H04L 41/046 709/223 |
| 2013/0124807 A1* | 5/2013 | Nielsen | ................ | G06F 3/0619 711/E12.103 |

(Continued)

OTHER PUBLICATIONS

The Open Group, CMPI Standard, retrieved from: http://cmpi-wg.github.io/cmpi_2.1.0_api.html. generated Oct. 5, 2015; 3 pages, Oct. 5, 2015.

*Primary Examiner* — Farhan M Syed
(74) *Attorney, Agent, or Firm* — McDermott Will & Emery LLP (57) ABSTRACT

Methods, systems, and computer programs encoded on computer storage medium, for receiving a request for instrumentation data describing one or more devices in the computing environment, the request received from a resource management interface; retrieving the instrumentation data describing the one or more devices from a resource database; identifying a schema associated with the resource management interface; converting the instrumentation data describing the one or more devices based on the identified schema associated with the resource management interface; and transmitting the instrumentation data describing the one or more devices to the resource management interface.

20 Claims, 4 Drawing Sheets

(56) References Cited

U.S. PATENT DOCUMENTS

| | | | |
|---|---|---|---|
| 2015/0268881 A1* | 9/2015 | Nielsen | G06F 11/1438 |
| | | | 711/114 |
| 2015/0310188 A1* | 10/2015 | Ford | G06F 21/10 |
| | | | 726/28 |
| 2017/0041296 A1* | 2/2017 | Ford | G06F 21/64 |
| 2017/0142076 A1* | 5/2017 | Ford | G06F 21/62 |
| 2018/0217819 A1* | 8/2018 | Leen | G06F 8/20 |
| 2020/0028936 A1* | 1/2020 | Gupta | H04L 67/02 |

\* cited by examiner

MANAGEMENT OF INSTRUMENTATION DATA USING A RESOURCE DATABASE

BACKGROUND

Field of the Disclosure

The disclosure relates generally to information handling systems, and in particular to management of instrumentation data using a resource database.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include an open standard that defines how managed elements in a computing environment are represented as a common set of objects. For example, a Common Information Model (CIM) schema may be used to represent managed devices as a set of classes with properties and associations that provide a framework for accessing and performing operations on the managed devices. This open standard may employ a lightweight server to direct access to specific managed elements within the computing environment on behalf of management interfaces requesting data describing a particular managed element, or requesting to perform system management tasks. For example, a CIM framework may include a Small-Footprint CIM Broker (SFCB) to route access between a management interface and a managed element, such that an end user can manage devices within the computing environment remotely via an application programming interface (API). Data is retrieved through the instrumentation layer of the system, requiring both time and high memory utilization to fulfill requests. However, such a solution is not scalable as an increasing number of management interfaces request access to managed devices using the same lightweight server, causing performance blocks with restrictions on parallel requests. This does not promote interoperability among systems and may require extensive troubleshooting due to complexity.

SUMMARY

Innovative aspects of the subject matter described in this specification may be embodied in a method for managing instrumentation data for a plurality of devices in a computing environment, where the method includes receiving a request for instrumentation data describing one or more devices in the computing environment, the request received from a resource management interface; retrieving the instrumentation data describing the one or more devices from a resource database; identifying a schema associated with the resource management interface; converting the instrumentation data describing the one or more devices based on the identified schema associated with the resource management interface; and transmitting the instrumentation data describing the one or more devices to the resource management interface.

In one or more of the disclosed embodiments, converting the instrumentation data describing the one or more devices based on the identified schema comprises: serializing a format of the instrumentation data describing the one or more devices into a format of the identified schema associated with the resource management interface.

In one or more of the disclosed embodiments, the method further comprises: identifying, by an event manager, a change event associated with a device of the plurality of devices, the change event modifying at least one property of the device; and in response to identifying the change event: generating, by the event manager, updated instrumentation data describing the device, the updated instrumentation data including the at least one property; and storing, by the event manager, the updated instrumentation data into the resource database.

In one or more of the disclosed embodiments, the instrumentation data describing the one or more devices includes at least one of: a class for each of the one or more devices; a set of class properties for each class; a data type for each of the set of class properties; a set of methods associated with each class; an input parameter for each of the set of methods; an output parameter for each of the set of methods; and a set of privileges associated with each class.

In one or more of the disclosed embodiments, the resource database is comprised of a plurality of data tables, each of the plurality of data tables including instrumentation data describing a device of the plurality of devices in the computing environment.

In one or more of the disclosed embodiments, the plurality of data tables includes instrumentation data in a common manageability programming interface (CMPI) format.

In one or more of the disclosed embodiments, the plurality of data tables includes instrumentation data in a Structured Query Language (SQL) format.

In one or more of the disclosed embodiments, the schema associated with the resource management interface is at least one of: an extensible markup language (XML) schema; and a JavaScript Object Notation (JSON) schema.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method and a system to manage instrumentation data for a plurality of devices in a computing environment. Specifically, this document describes receiving a request for instrumentation data describing one or more devices in the computing environment, the request received from a resource management interface; retrieving the instrumentation data describing the one or more devices from a resource database; identifying a schema associated with the resource management interface; converting the instrumentation data describing the one or more devices based on the identified schema associated with the resource management interface; and transmitting the instrumentation data describing the one or more devices to the resource management interface.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
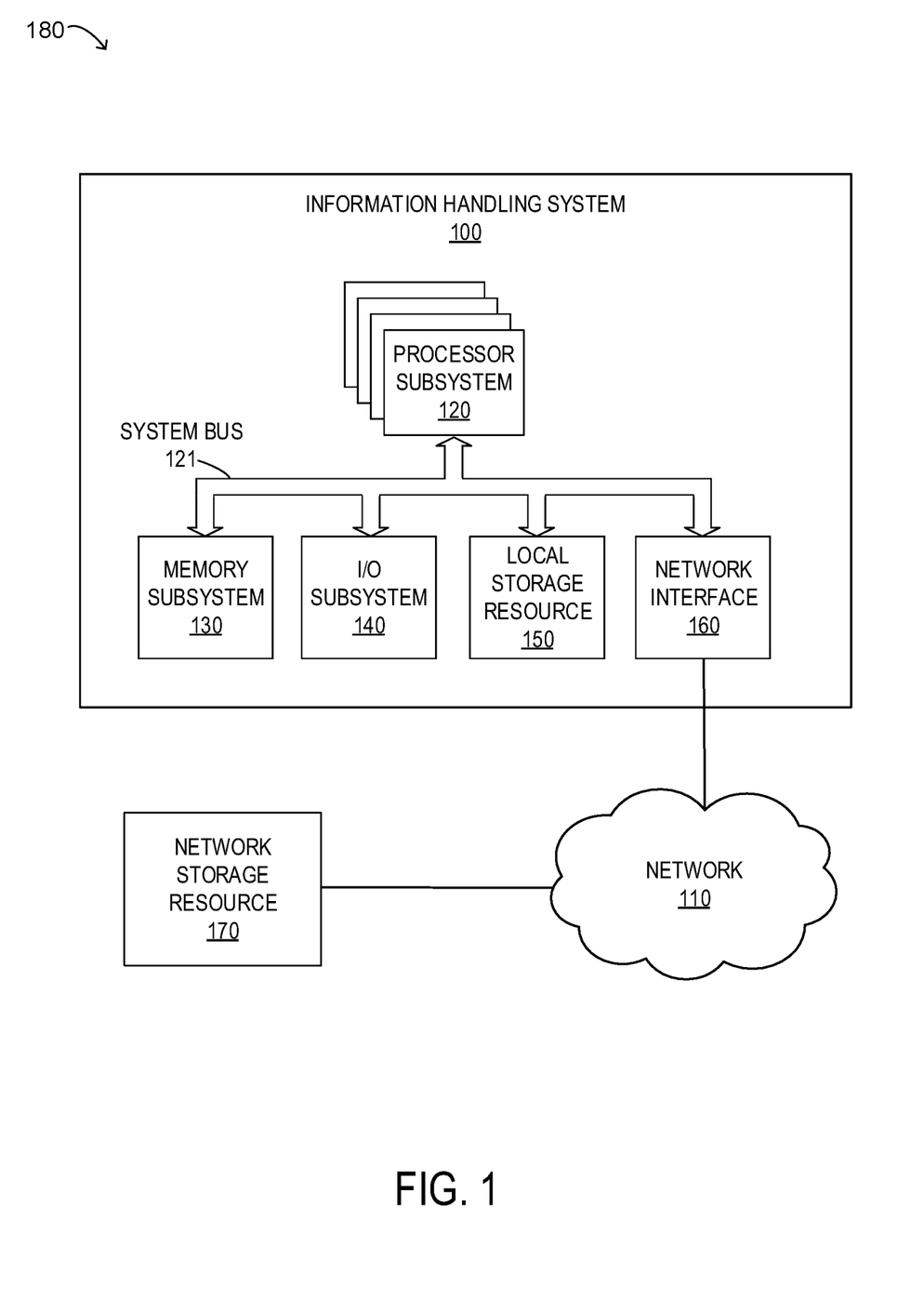
FIG. 1 is a block diagram of selected elements of an embodiment of an information handling system.
Figure 2:
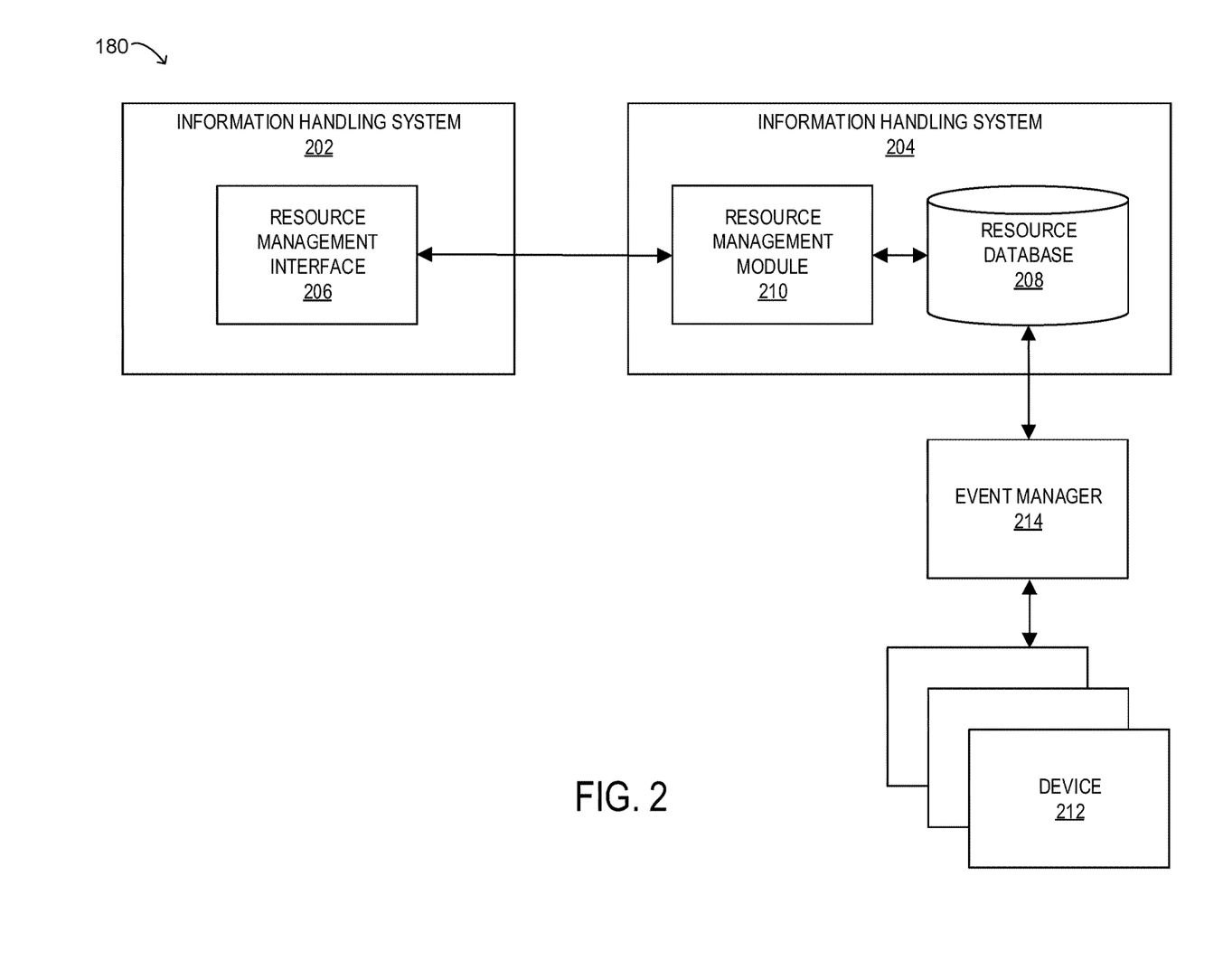
FIG. 2 is a block diagram of an embodiment of a computing environment for management of instrumentation data.
Figure 3:
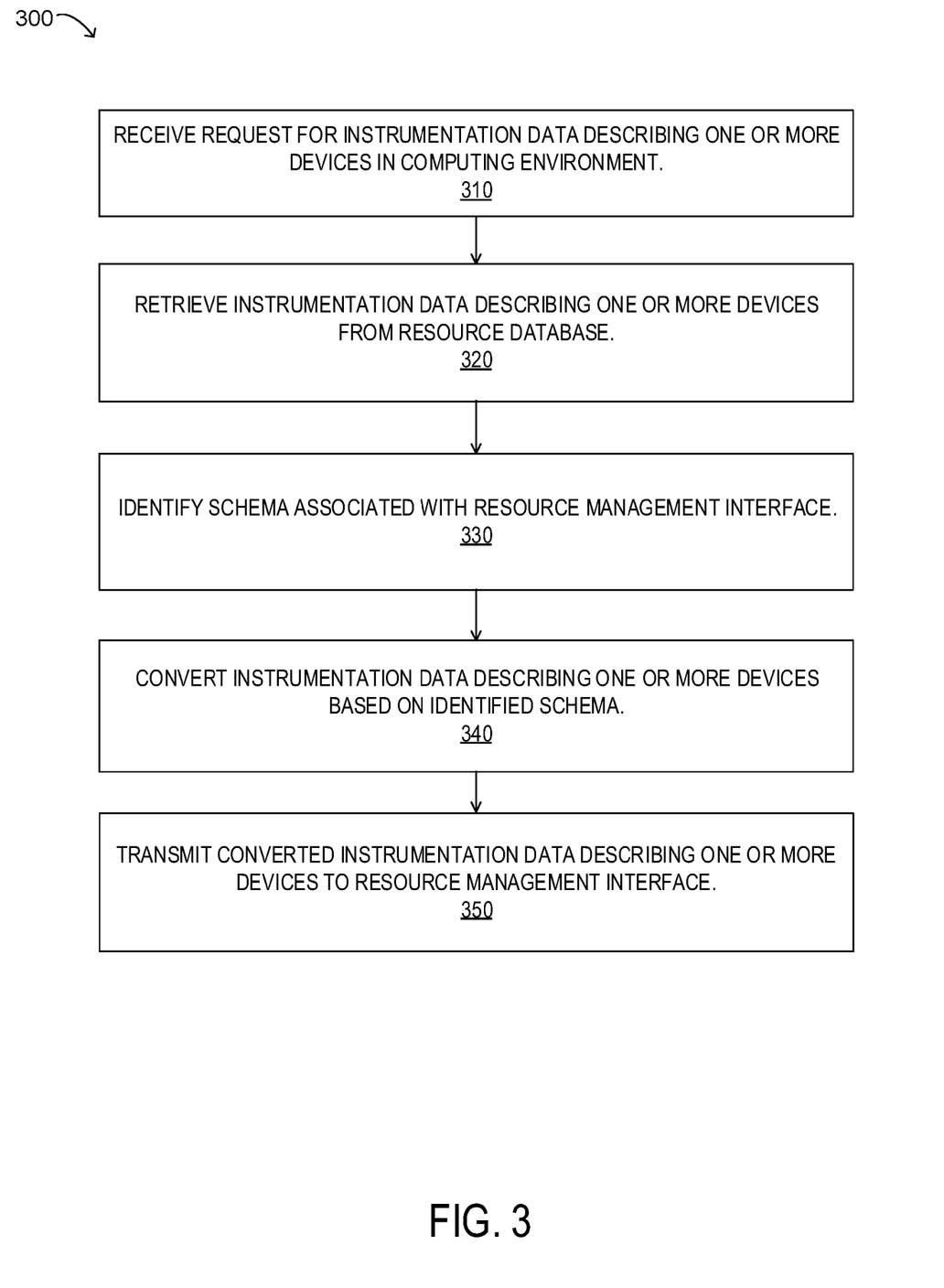
FIG. 3 is a flowchart depicting selected elements of an embodiment of a method for management of instrumentation data using a resource database.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

FIG. 2 is a block diagram of an embodiment of a computing environment for management of instrumentation data. In the embodiment illustrated in FIG. 2, computing environment 180 includes information handling systems (IHS) 202 and 204, event manager 214, and a plurality of devices 212. IHS 202 includes resource management interface 206. IHS 204 includes resource management module 210 and resource database 208. IHS 202 may be communicatively linked with IHS 204 such that resource management interface 206 may communicate with resource management module 210. In some embodiments, devices 212 can be internal to IHS 204. In some embodiments, resource database 208 may be external to IHS 204. In some embodiments, IHS 202 and 204 can include, or be similar to, information handling system 100 of FIG. 1.

In one or more embodiments, information handling systems 202 and 204 may share a management information exchange (inband or remote). In particular, the management information exchange may permit resource management interface 206 and resource management module 210 to exchange management information, such as "instrumentation data," associated with managed elements (e.g., devices 212) and/or may permit control and/or management of the managed elements. In addition, the management information exchange may include an interface through which managed elements may provide information and/or notifications. In one embodiment, the management information exchange may include a Windows Management Interface (WMI) for ACPI (available from Microsoft Corporation). In another embodiment, the management information exchange may include a Common Information Model (CIM) (available via the Distributed Management Task Force) and communicate using a common manageability programming interface (CMPI) schema. In one or more embodiments, the management information exchange may include a combination of the CMPI and the CIM such that the CMPI may be utilized as an interface to the CIM. For example, the CMPI may be utilized to provide and/or send CIM object information, such as instrumentation data, to resource management interface 206.

In one embodiment, CMPI may be used for transferring instrumentation data in the management information exchange. CMPI can include encapsulated data with introspection, and data encapsulation for data enumeration and actions/methods. In some examples, any CMPI data type that has management provider implementation-dependent details or contains CMPI data areas is an encapsulated data type. An encapsulated data type instance can include two parts—a pointer to its management provider dependent implementations and a pointer to a function table giving access to all operations supported by this type. Additionally, that are at least two components that define data items—the value itself and its type. As CMPI supports null values (i.e., a property has no value set), a third component can be used to define a state of the value indicating whether or not a value has been set. Values are represented as a union of all types supported by CMPI (e.g., "CMPIValue"). Types and value states are represented as typedefs (e.g., "CMPIType" and "CMPIValueState," respectively). In one embodiment, these three components are bundled into one structure (e.g., "CMPIData") for the management information exchange.

In the embodiment illustrated in FIG. 2, resource management interface 206 may be a suitable system, apparatus, or device operable to access and modify managed resources, such as devices 212, in computing environment 180. Resource management interface provides a common way for information handling systems to access and exchange information collected from devices 212 operating within computing environment 180. Resource management interface 206 can provide interoperability and consistency across different types of devices 212 or components in computing environment 180, such as operating systems and firmware, for example. End users may use resource management interface 206 to generate requests for access to instrumentation data describing devices 212. Once accessed, end users may analyze instrumentation data to identify and/or monitor certain properties associated with each device 212. For example, end users may analyze properties such as temperature, cooling fan speeds, and/or power status for any device 212 utilized by IHS 204. Analysis of instrumentation data can provide end users with insight into the performance of each device 212 in computing environment 180. For example, analysis may indicate which properties yield an optimal performance for each device 212, and which devices 212 might be operating outside of an expected range of properties. In addition, resource management interface 206 may be used to modify managed resources in computing environment 180. For example, end users of resource management interface 206 may perform CRUD (create, read, update, and delete) operations for any device 212 managed by information handling system 204. In some embodiments, resource management interface 206 may support additional operations such as Get, Put, Enumerate, Subscribe, Unsubscribe, Invoke, etc.

Resource management interface 206 may receive instrumentation data, or other such management information, from IHS 204 represented within a particular schema. In one embodiment, resource management interface 206 may receive instrumentation data in a schema that is different from its required schema. For example, resource management interface 206 may receive instrumentation data from IHS 204 having a CMPI schema used within a CIM data model. Here, resource management interface 206 may convert the instrumentation data encapsulated within CMPI data structures into a consumable format (e.g., XML, JSON, and the like). However, such conversion may require time and computational power, which may not be desirable for payloads including instrumentation data for several devices 212. In another embodiment, instrumentation data may be received in any schema required by resource management interface 206 (e.g., XML, JSON, and the like). For example, if a Redfish API requests instrumentation data describing bandwidth of a network card in computing environment 180 and requires a JSON schema, resource management module 210 can retrieve the requested instrumentation data and convert the instrumentation data into the JSON schema. In this way, resource management module 210 can create a dynamic view of the instrumentation data stored in resource database 208 for each resource management interface 206. In one embodiment, creating a dynamic view of the instrumentation may comprise retrieving instrumentation data from resource database 208 and converting a schema of the instrumentation data into a schema required by a resource management interface 206. In another embodiment, creating a dynamic view of the instrumentation data may comprise retrieving the instrumentation data from resource database 208 in a schema required by resource management interface 206. Resource management module 210 may identify a schema associated with resource management interface 206 and convert the instrumentation data prior its transmission. This is advantageous in that resource management interface 206 may simply receive the instrumentation data in a consumable native schema (e.g., XML) without requiring its conversion. Resource management module 210 is described in further detail below.

In the embodiment illustrated in FIG. 2, resource database 208 may be a suitable system, apparatus, or device operable to store instrumentation data describing each managed resource in computing environment 180. In particular, resource database 208 is a relational database comprised of data tables populated with instrumentation data describing each device 212 in computing environment 180. Resource database 208 may be accessed by resource management module 210 to retrieve instrumentation data describing one or more devices 212 specified in a request from resource management interface 206. Accessing instrumentation data stored in resource database 208 rather than collecting instrumentation data from the instrumentation layer in response to a request from resource management interface 206 minimizes overall latency in retrieving and providing instrumentation data to end users. Instrumentation data is cached in resource database 208 such that it is available when it is needed. For example, instrumentation data may be accessed and provided to an end user in milliseconds rather than propagating a request for instrumentation data through provider and instrumentation layers. In one embodiment, resource database 208 is a Structured Query Language (SQL) database comprised of SQL tables which are queried by the system to access instrumentation data. In other embodiments, resource database 208 may be an object database, graph database, network database, document database, or any other type of database suitable for storing instrumentation data of managed resources.

In one embodiment, instrumentation data stored in resource database 208 may comprise data used to model each device 212 in computing environment 180. Each device 212 in computing environment 180 is represented by a class, or an extensible template for creating objects in a CIM environment. Each class serves as a container that defines properties and methods common to each managed resource. In particular, classes contain properties and methods that describe the data and behaviors associated with each class, respectively. Instrumentation data may include these properties and methods for each device 212, in addition to its class and any other relevant metadata. For example, instrumentation data may include a class for each device, a set of class properties for each class, a data type for each set of class properties, a set of methods associated with each class, an input parameter for each set of methods, an output parameter for each set of methods, and a set of privileges associated with each class. In another embodiment, instrumentation data may include additional data describing license details required to access resources and operations supported by each resource. In other embodiments, instrumentation data may include additional, fewer, or any other data suitable for representation of managed resources.

In one embodiment, resource database 208 is comprised of data tables populated with instrumentation data describing each device 212 in computing environment 180. In one embodiment, each data table includes instrumentation data describing a device 212. For example, a data table in resource database 208 may include instrumentation data describing a peripheral component interconnect (PCI) device that includes a bus number, slot type, and vendor ID. In another embodiment, each data table describes metadata associated with the devices 212 in computing environment 180. In particular, resource database 208 may include data tables describing class schema metadata, class metadata, class data, supported operations metadata, method schema metadata, and association metadata. The class schema metadata table may describe class information, such as class name, class properties, class method names and property data type for each device 212 in computing environment 180. Class metadata table may include data describing class inheritance and class registration details such as provider name and namespace information. Class data table may include data pertaining to each class, such as class properties and values. Supported operations metadata table may provide information for license and privileges associated with each device 212, signifying whether an end user may require license and privilege to access a particular device 212 or managed resource. For example, an end user may be allowed access to sensor instrumentation data in resource database 208, but may require a specific license and elevated privilege to perform a RAID operation. Method schema metadata table may provide information related to methods belonging to a class, such as method name, input and output parameters for each method, and a data type for each parameter. Association metadata table may provide data describing each supported association between classes. For example, the association between two related management classes may be described by an association class. This association class can have properties such as a left class (e.g., CMPILeftClass) and a right class (e.g., CMPIRightClass) bound by instances of the class. The association class may define the roles of the left class and right class, and may further define references of the instances that bind the left and right classes.

In one embodiment, resource database 208 may include data tables populated with instrumentation data in various schemas (e.g., XML, JSON, CMPI, and the like) associated with standard resource management interfaces 206. That is, instrumentation data describing a particular device 212 in computing environment 180 may be represented in different formats throughout resource database 208. This ensures that each device 212 is modeled in resource database 208 in a schema that is readily consumable for each resource management interface 206 without requiring conversion (e.g., on behalf of resource management interface 206 and/or resource management module 210). For example, each device 212 modeled in resource database 2018 may be described by instrumentation data in both XML and JSON schemas. In one embodiment, each schema may be represented across multiple data tables such that each data table is populated with instrumentation data in a separate schema. In another embodiment, each device 212 may be modeled in a single data table that includes representations in each schema.

In the embodiment illustrated in FIG. 2, event manager 214 may be a suitable system, apparatus, or device operable to maintain and update instrumentation data stored in resource database 208. In particular, event manager 214 is a hardware abstraction layer (HAL) between devices 212 and information handling system 204 that can communicate (e.g., via low-level plugins) with each device 212 in computing environment 180 and can store instrumentation data collected from each device 212 into resource database 208. In one embodiment, event manager 214 can employ a CMPI data structure to send instrumentation data to resource database 208. Specifically, a CMPI structure can be a standardized way of communicating between event manager 214 and IHS 204. The CMPI format can include such granularity that can define a configuration method, data size, values, data type, and metadata associated with each device 212 to be included as instrumentation data provided to resource database 208 for storage.

In one embodiment, event manager 214 can identify events within computing environment 180 that modify devices 212, or "change events," and can generate updated instrumentation data including the modified properties of the devices 212 to be stored in resource database 208. That is, event manager 214 can identify a change event (e.g., upon receiving notification from a low-level plug-in) associated with a device 212 that modifies at least one property of the device 212, generate updated instrumentation data that includes the at least one property, and store the updated instrumentation data into the resource database 208. This ensures that modified devices 212 are accurately modeled in the resource database 208 following change events within the computing environment 180 such that a current status of each device 212 is available for end users. For example, if an end user changes the bandwidth of a network card in computing environment 180, event manager 214 can receive notification of the change (e.g., in a C data structure), update instrumentation data describing the network card to include the modified bandwidth properties, and store the updated instrumentation data into resource database 208 such that the network card is accurately modeled in the database. In one embodiment, event manager 214 can update instrumentation data for all devices 212 stored in resource database 208 at build time. For example, event manager 214 may employ a script (e.g., Python script) to populate each data table in resource database 208 each time information handling system 204 is rebooted.

In the embodiment illustrated in FIG. 2, resource management module 210 may be a suitable system, apparatus, or device operable to manage requests generated by resource management interface 206. In particular, resource management module 210 can receive a request for instrumentation data from resource management interface 206, retrieve the requested instrumentation data from resource database 208, and can transmit the requested instrumentation data to resource management interface 206 in a schema required by resource management interface 206. By retrieving instrumentation data from resource database 208 rather than from individual devices 212 (e.g., via low-level plug-ins), resource management module 210 minimizes overall latency in retrieving and providing instrumentation data to end users. In addition, because instrumentation data is stored in one location, resource management module 210 may retrieve instrumentation data at a consistent rate (e.g., milliseconds) regardless of the amount of instrumentation data requested. Furthermore, by transmitting instrumentation data in a schema required by a resource management interface 206, resource management module 210 saves resource management interface 206 time and computational power that may otherwise be necessary to convert the instrumentation data into a consumable format.

In some embodiments, resource management module 210 can parse the request received from resource management interface 206 and determine a schema associated with resource management interface 206. That is, resource management module 210 can parse the request in view of data stored in data structures comprising the request, and identify a schema used by resource management interface 206. In one embodiment, resource management module 210 may select instrumentation data in the required schema from a data table, or over multiple data tables, of resource database 208. In another embodiment, resource management module 210 may convert the instrumentation data such that it is transmitted to resource management interface 206 in the identified schema required by resource management interface 206. Specifically, resource management module 210 may retrieve the instrumentation data from resource database 208 where it is stored in a particular schema (e.g., CMPI, SQL, etc.), and serialize the retrieved instrumentation data into the schema required by resource management interface 206 (e.g., XML, JSON, and the like) prior to transmitting the instrumentation data.

By dynamically converting instrumentation data at runtime, resource management module 210 can minimize replication of instrumentation data stored in resource database 208. That is, resource management module 210 can provide a generic interface for resource management interfaces that may require instrumentation data in various schemas. For example, if computing environment 180 includes a fan device operating at a speed of 2400 revolutions per minute (RPM), a data table representing the fan (stored in resource database 208) may include an entry describing the speed of the fan as "2400 RPM." If a resource management interface 206 requiting an XML schema, such as a Web Services-Management (WS-Man) API for example, generates a request for instrumentation data describing the speed of the fan device, resource management module 210 may not need to dynamically convert the instrumentation data given the XML schema of the resource management interface 206. However, a resource management interface 206 requiring a JSON schema, such as a Redfish API for example, that requests the same instrumentation data may require a representation having separate values and units. Here, resource management module 210 can dynamically convert the data table entry representing the fan speed into a value (2400) and a unit (RPM) before transmitting the instrumentation data such that it does not require conversion when it is received. Here, resource management module 210 can use its generic interface to create a dynamic view of instrumentation data stored in resource database 208 for each requesting resource management interface 206 according to a schema, or format, required by the resource management interface 206. In doing so, resource management module 210 can convert, or abstract out, a schema from the data tables that is readily consumable for resource management interfaces 206 based on a single data table entry.

FIG. 3 is a flowchart depicting selected elements of an embodiment of a method for management of instrumentation data using a resource database. The method 300 may be performed by information handling system 100, computing environment 180, resource management module 210, and/or resource management interface 206, described herein with reference to FIGS. 1-2, or another information handling system. It is noted that certain operations described in method 300 may be optional or may be rearranged in different embodiments.

The resource management module 210 can receive 310 a request for instrumentation data describing one or more devices 212 in computing environment 180 from resource management interface 206. The resource management module 210 can retrieve 320 the instrumentation data describing the one or more devices 212 from resource database 208. The resource management module 210 can identify 330 a schema associated with resource management interface 206 and convert 340 the instrumentation data describing the one or more devices based on the identified schema associated with resource management interface 206. For example, if resource management interface 206 requires an XML schema, resource management module 210 can serialize the instrumentation data—which may be retrieved from resource database 208 in a CMPI or SQL schema—into an XML schema such that it does not require conversion by resource management interface 206. The resource management module 210 can transmit 350 the instrumentation data describing the one or more devices to resource management interface 206.

Figure 4:
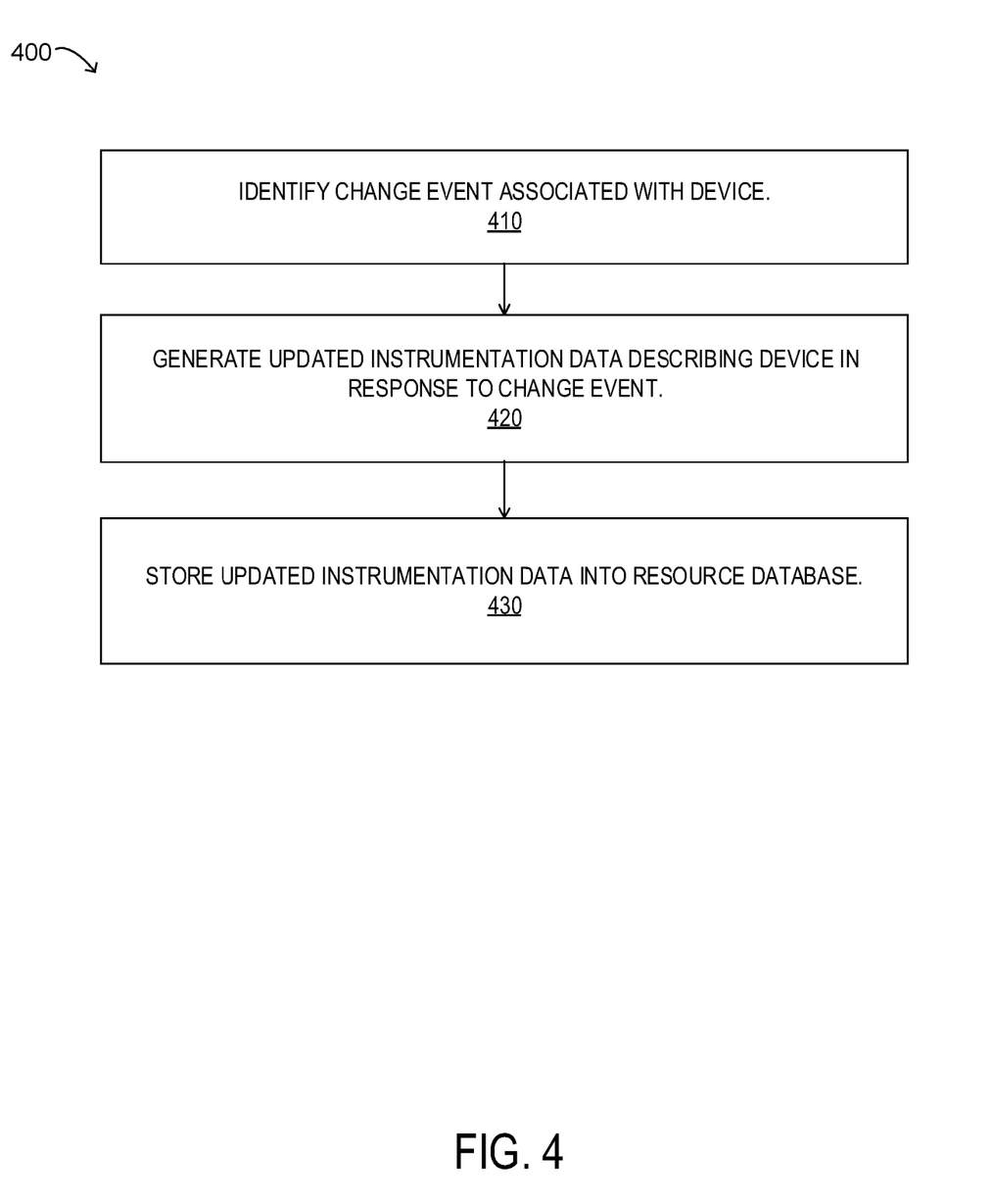
FIG. 4 is a flowchart depicting selected elements of an embodiment of a process for updating instrumentation data in response to change events.

FIG. 4 is a flowchart depicting selected elements of an embodiment of a process for updating instrumentation data in response to change events. The process 400 may be performed by event manager 214, information handling system 100, computing environment 180, resource management module 210, and/or resource management interface 206, described herein with reference to FIGS. 1-2, or another information handling system. It is noted that certain operations described in process 400 may be optional or may be rearranged in different embodiments.

The event manager 214 can identify 410 a change event associated with a device 122 that modifies at least one property of the device 122. In response to identifying the change event, the event manager 214 can generate updated instrumentation data describing the device 122 that includes the at least one property modified by the change event. The event manager 214 can store 430 the updated instrumentation data into the resource database.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing instrumentation data for a plurality of devices in a computing environment, the method comprising:

identifying, by a hardware abstraction layer between an information handling system in the computing environment and the plurality of devices, a change event associated with a device of the plurality of devices, the change event modifying at least one property of the device;

in response to identifying the change event:
generating, by the hardware abstraction layer, updated instrumentation data describing the device, the updated instrumentation data including the at least one property; and
storing, by the hardware abstraction layer, the updated instrumentation data into a resource database;

receiving a request for instrumentation data describing at least the device of the plurality of devices that includes the device of the plurality of devices, the request received from a resource management interface;

parsing the request to identify a schema associated with the resource management interface;

creating a dynamic view of the instrumentation data describing the at least the device of the plurality of devices by:
retrieving the instrumentation data describing the at least the device of the plurality of devices from the resource database; and
converting, to converted instrumentation data, the instrumentation data describing the at least the device of the plurality of devices based on the identified schema associated with the resource management interface; and transmitting the converted instrumentation data describing the at least the device of the plurality of devices to the resource management interface for analysis.

2. The method of claim 1, wherein converting the instrumentation data describing the at least the device of the plurality of devices based on the identified schema comprises:
serializing a format of the instrumentation data describing the at least the device of the plurality of devices into a format of the identified schema associated with the resource management interface.

3. The method of claim 1, wherein the instrumentation data describing the at least the device of the plurality of devices includes at least one of:
a class for each of the at least the device of the plurality of devices;
a set of class properties for each class;
a data type for each of the set of class properties;
a set of methods associated with each class;
an input parameter for each of the set of methods;
an output parameter for each of the set of methods; and
a set of privileges associated with each class.

4. The method of claim 1, wherein the resource database is comprised of a plurality of data tables, each of the plurality of data tables including instrumentation data describing one or more devices of the plurality of devices in the computing environment.

5. The method of claim 4, wherein the plurality of data tables includes instrumentation data in a common manageability programming interface (CMPI) format.

6. The method of claim 4, wherein the plurality of data tables includes instrumentation data in a Structured Query Language (SQL) format.

7. The method of claim 1, wherein the schema associated with the resource management interface is at least one of:
an extensible markup language (XML) schema; and
a JavaScript Object Notation (JSON) schema.

8. A system comprising a processor having access to memory media storing instructions executable by the processor to perform operations comprising:
identifying, by a hardware abstraction layer between an information handling system in a computing environment and a plurality of devices in the computing environment, a change event associated with a device of the plurality of devices, the change event modifying at least one property of the device;

in response to identifying the change event:
generating, by the hardware abstraction layer, updated instrumentation data describing the device, the updated instrumentation data including the at least one property; and
storing, by the hardware abstraction layer, the updated instrumentation data into a resource database;

receiving a request for instrumentation data describing at least the device of the plurality of devices that includes the device of the plurality of devices, the request received from a resource management interface;

parsing the request to identify a schema associated with the resource management interface;

creating a dynamic view of the instrumentation data describing at least the device of the plurality of devices by:
retrieving the instrumentation data describing the at least the device of the plurality of devices from a resource database; and
converting, to converted instrumentation data, the instrumentation data describing the at least the device of the plurality of devices based on the identified schema associated with the resource management interface; and transmitting the converted instrumentation data describing the at least the device of the plurality of devices to the resource management interface for analysis.

9. The system of claim 8, wherein converting the instrumentation data describing the at least the device of the plurality of devices based on the identified schema comprises:
serializing a format of the instrumentation data describing the at least the device of the plurality of devices into a format of the identified schema associated with the resource management interface.

10. The system of claim 8, wherein the instrumentation data describing the at least the device of the plurality of devices includes at least one of:
a class for each of the at least the device of the plurality of devices;
a set of class properties for each class;
a data type for each of the set of class properties;
a set of methods associated with each class;
an input parameter for each of the set of methods;
an output parameter for each of the set of methods; and
a set of privileges associated with each class.

11. The system of claim 8, wherein the resource database is comprised of a plurality of data tables, each of the plurality of data tables including instrumentation data describing one or more devices of the plurality of devices in the computing environment.

12. The system of claim 11, wherein the plurality of data tables includes instrumentation data in a common manageability programming interface (CMPI) format.

13. The system of claim 11, wherein the plurality of data tables includes instrumentation data in a Structured Query Language (SQL) format.

14. The system of claim 8, wherein the schema associated with the resource management interface is at least one of:
   an extensible markup language (XML) schema; and
   a JavaScript Object Notation (JSON) schema.

15. A non-transitory computer-readable medium storing software comprising instructions executable by one or more computers which, upon such execution, cause the one or more computers to perform operations comprising:
   identifying, by a hardware abstraction layer between an information handling system in the computing environment and the plurality of devices, a change event associated with a device of the one or more devices, the change event modifying at least one property of the device;
   in response to identifying the change event:
      generating, by the hardware abstraction layer, updated instrumentation data describing the device, the updated instrumentation data including the at least one property; and
      storing, by the hardware abstraction layer, the updated instrumentation data into a resource database;
   receiving a request for instrumentation data describing at least the device of the plurality of devices, the request received from a resource management interface;
   parsing the request to identify a schema associated with the resource management interface;
   creating a dynamic view of the instrumentation data describing the at least the device of the plurality of devices by:
      retrieving the instrumentation data describing the at least the device of the plurality of devices from the resource database; and
      converting, to converted instrumentation data, the instrumentation data describing the at least the device of the plurality of devices based on the identified schema associated with the resource management interface; and
   transmitting the converted instrumentation data describing the at least the device of the plurality of devices to the resource management interface for analysis.

16. The non-transitory computer-readable medium of claim 15, wherein converting the instrumentation data describing the at least the device of the plurality of devices based on the identified schema comprises:
   serializing a format of the instrumentation data describing the one or more devices into a format of the identified schema associated with the resource management interface.

17. The non-transitory computer-readable medium of claim 15, wherein the resource database is comprised of a plurality of data tables, each of the plurality of data tables including instrumentation data describing one or more devices of the plurality of devices in the computing environment.

18. The method of claim 1, wherein the hardware abstraction layer employs a common manageability programming interface (CMPI) data structure to send instrumentation data to the resource database.

19. The system of claim 8, wherein the hardware abstraction layer employs a common manageability programming interface (CMPI) data structure to send instrumentation data to the resource database.

20. The non-transitory computer-readable medium of claim 15, wherein the hardware abstraction layer employs a common manageability programming interface (CMPI) data structure to send instrumentation data to the resource database.

* * * * *